3,304,237
METHOD OF PRODUCING 17β-HYDROXY-RETRO-STEROIDS WITH SPORORMIA SPECIES
Jan de Flines and Willem Frederik van der Waard, Delft, Netherlands, assignors, by mesne assignments, to Koninklijke Nederlandse Gist & Spiritusfabrieken, a corporation of the Netherlands
No Drawing. Filed Oct. 15, 1963, Ser. No. 316,472
Claims priority, application Netherlands, Oct. 16, 1962, 284,412
9 Claims. (Cl. 195—51)

The invention relates to the production of 17β-hydroxy-retro-steroids.

The term "retro-steroids" is to denote herein 10,13-cyclopentano-perhydrophenanthrene derivatives, of which the methyl group at carbon atom 10 is in α-configuration and the hydrogen atom or the substitutent of carbon atom 9 is in β-configuration, as well as the methyl group at carbon atom 13.

Retro-steroids, the production and the use thereof are known for example from Belgian patent specification 577,615.

17β-hydroxy-retro-steroids can be readily obtained by chemical agency by the reduction of the corresponding 17-keto-retro-steroids. The latter compounds can, however, be produced chemically with substantial difficulty only, either since the required starting substances are not readily accessible or since the production in itself can be performed only either in various reaction steps or with a poor yield. Such disadvantages apply for example to the conversion of retro-progesterone into retro-androst-4-ene, 3,17-dione or to the oxidation of so-called lumisterol$_2$ into the aforesaid 3,17-diketone.

Experiments leading to this invention proved that it is possible to produce by microbiological agency in one step 17β-hydroxy-retro-steroids from retro-pregnanes, which are oxygenated at carbon atom 20. Affiliated microbiological reactions in the normal steroid series (in which the methyl group at position 10 is in β-configuration and the hydrogen atom at position 9 is in α-configuration) are already known. It has for example been achieved to produce 17-keto-steroids from 20-keto-allopregnanes with the aid of enzyme systems of fungi of the genus of Penicillium (Dutch patent specification 90,188) and 17-keto-steroids were also produced from cultures of fungi of the genus of *Gliocladium gorda*, to which a 20-keto-steroid was added by the method described in Dutch patent specification 89,724.

The invention relates to a method of producing 17β-hydroxy-retro-steroids and is characterized in that a retro-pregnane having at position 20 a keto- or a hydroxy-group is brought into contact in an aqueous dispersion with oxygen and a development stage of the micro-organism of the species of Sporormia or oxygenating enzyme systems formed thereby. It was a surprise to find herein that the said micro-organisms perform the conversion(s) concerned with the steroids of the retro-series, but not with the steroids of the normal series. Micro-organisms of the species of Sporormia belong to the order of the Sphaeridales of the class of the Ascomycetes. Among the various known Sporormia species the *Sporormia pollaccii* Elisei yielded the best results in the method according to this invention. Apart therefrom favourable results were obtained with *Sporormia fasciculata*, *Sporormia leporina* and *Sporormia montana*.

The retro-pregnanes suitable as a starting material in the method according to the invention must be oxygenated at carbon atom 20. If also carbon atom 21 has a double bond of an oxygen atom or a hydroxy group, it is found that conversions into 17β-hydroxy-retro-steroids are also possible, so that also this type of compounds can be employed as starting retro-steroids.

It is advisable to use starting steroids having a 3-keto-Δ$^4$-group. The combination of this group with a double bond between carbon atoms 6 and 7 is found, however, to bring about a drastic decomposition of the total retro-steroid at least with the conversion of 6-dehydro-retro-progesterone, so that for this reason the presence of a Δ$^6$-double bond is not desirable.

The conversion according to the invention is preferably carried out with cultures of the Sporormia species or with the oxygenating enzyme systems thereof. Apart therefrom it is, however, also possible to carry out the conversion with conidia of Sporormia. The microbiological conversions need not give rise to particular difficulties to experts in this field, since the reactions concerned may be performed in a manner known per se. For example, first a culture of the species of the fungus is caused to develop under aerobic conditions in a nutrient solution, after which a fermentation medium containing the retro-steroid to be converted, which may be added in a solution or a suspension, is subjected to the oxybiontic dissimilation activity of the formed mycelium. The nutrient solution consists mainly of a carbon source and a nitrogen source, for example a carbohydrate, e.g. glucose, maltose or starch and an organic nitrogen source, e.g. corn steep liquor or yeast extract, protein hydrolysates, amino-acids or an inorganic nitrogen source, e.g. ammonium salts or alkaline metal nitrates. To the medium containing the steroid to be oxygenated and one or more of the aforesaid nutrient sources may, if desired, be added an anti-foam agent for example glyceryl monostearate. The most suitable fermentation temperature usually lies between 20° C. and 28° C., but higher or lower temperatures between 15° C. 35° C. may, in general, also be applied. The time required for the conversion of the retro-steroid may vary between wide limits, but usually a period of oxygenation of 10 to 48 hours is the optimum for full conversion. The 17β-hydroxy-retro-steroid obtained at the termination of the oxygenation process may be separated from the medium and/or the mycelium in any known manner, preferably by extraction from organic solvents not miscible with water, e.g. diethylether, ethylacetate, amylacetate, methylisobutylketone or other esters and ketones. Particularly suitable is the methylisobutylketone as an extraction agent. The steroid thus obtained may also be isolated and purified by chromatographic methods, in conjunction or not in conjunction with extraction, from the fermentation medium.

The method according to the invention may also be carried out by reacting conidia of Sporormia species with aqueous dispersions of the starting retro-steroids mentioned above.

The invention will be described more fully with reference to the following examples.

*Example 1.—Conversion of retro-progesterone into retro-testosterone in shaking flasks*

A nutrient solution containing 20 gms. of inspissated corn steep liquor, 15 gms. of glucose and 6 gms. of yeast hydrolysate per 1000 mls. of tap water, subsequent to the adjustment to a value of the pH of 6.6 and to sterilisation at 120° C. for 20 minutes, was inoculated with a culture of *Sporormia pollaccii* grown on oats agar per portion of 250 mls. in shaking flasks of 1000 mls. After shaking for 48 hours (250 rev./min.) at 26° C. these inoculation cultures were again inoculated (inoculation percentage 5%) in twelve Erlenmeyer flasks of 2000 mls. with a sterilised nutrient solution of 1000 mls. containing corn steep liquor 0.3% (calculated on the dry substance), glucose 0.4%, glyceryl monostearate 0.04%; pH=6.8 (with 2 N sodium hydroxide). These cultures were rotated under the aforesaid conditions for 24 hours, after which under aseptic conditions each culture had added to it 200 mgs. of retro-progesterone, dissolved in 10 mls. of methylcellosolve. After 48-hours shaking the fermentation was interrupted with a pH of 4.6, after it had been proved by paper-chromatographic means (benzene/formamide), that the conversion into retro-testosterone had been achieved nearly complete. The shaken cultures were collected and isolated from the mycelium by filtration. The culture filtrate (12 litres) was extracted three times from 2400 mls. of methylisobutyl-ketone and then evaporated in vacuo to 300 mls., which was washed with 30 mls. of 0.1 N sodium hydroxide and finally three times with 30 mls. of distilled water. The evaporated and washed extract was then decoloured with carbon and finally evaporated to a white crystalline residue. This residue was dissolved in 5 mls. of boiling acetone, after which 15 mls. of heptane was added. After distilling off the acetone 1.56 gms. of retro-testosterone was crystallised out. This process was repeated, yielding 1.3 gms. of pure retro-testosterone having a melting point of 153.5–154.5° C.

$(\alpha)_D^{20} = -150°$ (c.=1, chloroform)

*Example II.—Conversion of retro-progesterone into retro-testosterone in fermentation tanks*

A 48-hours aged inoculation culture of *Sporormia pollaccii* obtained as described in Example I of 2000 mls. was transferred to a fermentation tank of 60 litres, provided with an agitator and an aerator and containing 40 litres of nutrient medium consisting of a sterilised solution of 200 gms. of corn steep liquor (calculated on the dry substance), 200 gms. of glucose, 12.5 gms. of glyceryl monostearate in tap water (pH=6.4 by 2 N sodium hydroxide). After an incubation of 24 hours at 25° C. (speed of 140 rev./min., air supply of 10 litres/min.) 13.4 gms. of retro-progesterone, dissolved in 450 mls. of acetone, was added under aseptic conditions, after which fermentation was prolonged for 24 hours. The culture filtrate was processed in the manner described in Example I. After the double recrystallisation with the aid of acetone-heptane, the crystalline final product (7.2 gms.) was again recrystallised by dissolving it in 30 mls. of methanol, treating it with carbon, by filtration, by dilution with methanol to 50 mls. and by adding, whilst heating, 50 mls. of distilled water. After cooling 6 gms. of pure retro-testosterone was separated out from this solution. From the mother liquors a further 800 mgs. of final product was isolated. The final product exhibited the same physical constants as those mentioned in Example I. Instead of retro-progesterone the following steroids may be used as starting material 1-methyl-retro-progesterone
2-methyl-retro-progesterone
4-bromo-retro-progesterone
4-chloro-retro-progesterone
6-chloro-retro-progesterone
6-bromo-retro-progesterone
6-chloro-retro-progesterone
9-fluoro-retro-progesterone
1-dehydro-2-methyl-retro-progesterone
6-hydroxy-retro-progesterone
6-azetoxy-retro-progesterone
2-hydroxy-retro-progesterone 2-acetate
2-hydroxy-retro-progesterone
21-hydroxy-retro-progesterone
21-hydroxy-retro-progesterone 21-acetate
11,21-dihydroxy-retro-progesterone
retro-pregn-4-en-3-on-20-ol

What is claimed is:
1. A method of producing a 17α-H-17β-hydroxy-retro-steroid comprising aerobically subjecting a retro-steroid oxygenated at the C20 carbon atom and free from a 3-keto-$\Delta^{4,6}$ structure to the action of a microorganism selected from the group consisting of the developmental stages of the Sporormia species and the oxygenating enzyme systems thereof and recovering said 17α-H-17β-hydroxy-retro-steroid.
2. The method of claim 1 wherein the microorganism is *Sporormia pollaccii* (Elisei).
3. The method of claim 1 wherein the microorganism is *Sporormia fasciculata*.
4. The method of claim 1 wherein the microorganism is *Sporormia leporina*.
5. The method of claim 1 wherein the microorganism is *Sporormia montana*.
6. A method of producing a 3-keto-$\Delta^4$-17α-H-17β-hydroxy-retro-steroid comprising aerobically subjecting a 3-keto-$\Delta^4$-retro-steroid oxygenated at the C20 atom and free from a 3-keto-$\Delta^{4,6}$ structure to the action of a microorganism selected from the group consisting of the developmental stages of the Sporormia species and the oxygenating enzyme system thereof and recovering said 3-keto-$\Delta^4$-17α-H-17β-hydroxy-retro-steroid.
7. The method of claim 6 wherein retro-progesterone is converted to retro-testosterone.
8. The method of claim 7 wherein the conversion takes place in a culture of *Sporormia pollaccii*.
9. The method of claim 7 wherein the conversion takes place in an oxygenating enzyme system of *Sporomia pollaccii*.

References Cited by the Examiner

FOREIGN PATENTS 846,914    9/1960    Great Britain.

A. LOUIS MONACELL, *Primary Examiner.*

D. M. STEPHENS, *Assistant Examiner.*